United States Patent [19]

Pirchl

[11] Patent Number: 5,067,339
[45] Date of Patent: Nov. 26, 1991

[54] CUTTING AND FORMING TOOL FOR COMPLICATED FLAT STRUCTURES

[75] Inventor: Gerhard Pirchl, Birrwil, Switzerland

[73] Assignee: AAW Producktions Aktiengesellschaft, Fu Rstentum, Liechtenstein

[21] Appl. No.: 392,948

[22] PCT Filed: Oct. 11, 1988

[86] PCT No.: PCT/CH88/00187
§ 371 Date: Aug. 15, 1989
§ 102(e) Date: Aug. 15, 1989

[87] PCT Pub. No.: WO89/03751
PCT Pub. Date: May 5, 1989

[30] Foreign Application Priority Data

Oct. 29, 1987 [CH] Switzerland ............. 4241/87-8

[51] Int. Cl.⁵ .................. B21D 28/14; B26F 1/44
[52] U.S. Cl. ............................ 72/329; 72/327; 83/620; 83/686
[58] Field of Search ............. 72/326, 327, 335, 333, 72/329; 83/620, 622, 914, 192, 686, 689

[56] References Cited

U.S. PATENT DOCUMENTS

| 712,435 | 10/1902 | Liningstone | 83/620 |
| 968,122 | 8/1910 | Carr | 83/55 |
| 1,411,774 | 4/1922 | Engel | . |
| 2,017,247 | 10/1935 | Hodge | 83/686 |
| 2,173,730 | 9/1939 | Schmied | 83/620 |
| 2,600,834 | 6/1952 | Blair | 83/620 |
| 2,818,923 | 1/1958 | Pascuale | 83/620 |
| 3,110,141 | 11/1963 | Dalgleish | 83/686 |
| 3,499,360 | 3/1970 | Davis | 83/620 |

FOREIGN PATENT DOCUMENTS 42995 4/1888 Fed. Rep. of Germany .

Primary Examiner—Daniel C. Crane
Attorney, Agent, or Firm—Tarolli, Sundheim & Covell

[57] ABSTRACT

A tool comprises a lower part (2) and an upper part (1). The upper part (1) of the tool can slide on guides (3) and has a force plug (7) and a blanking punch (4). A die-plate (5) arranged on the lower part (1) of the tool contains a mold cavity (16) of a die (6). The blanking punch (4) and the die-plate (5) each have a plurality of individual blanking elements (20, 30). Facing pairs of blanking elements (20, 30) have cutting edges (23, 33) directed toward the cutting line (15). The blanking elements (20, 30) have a polygonal cross-section and are aligned next to each other along their edges.

8 Claims, 3 Drawing Sheets

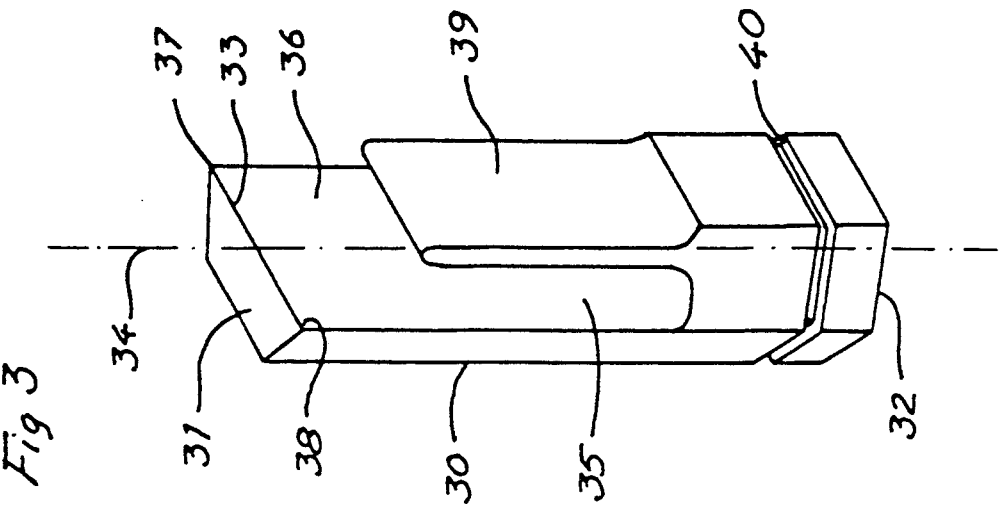
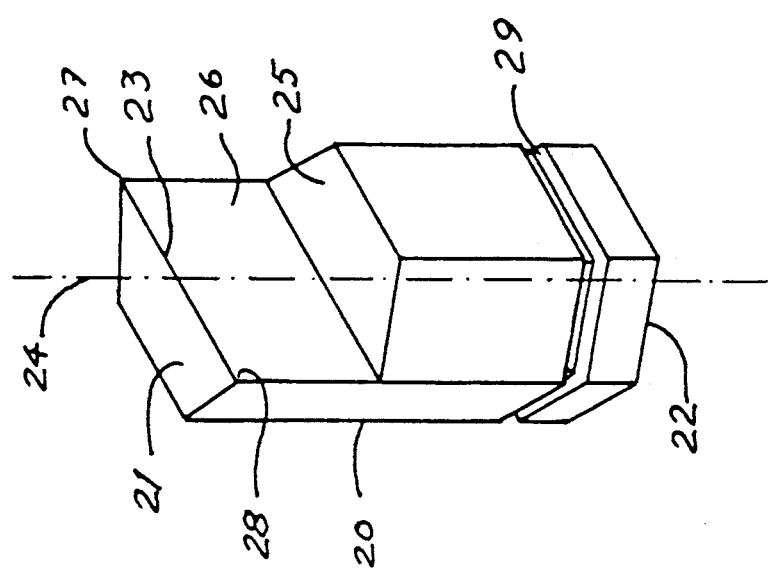

5,067,339

CUTTING AND FORMING TOOL FOR COMPLICATED FLAT STRUCTURES

TECHNICAL FIELD

The invention relates to a cutting and forming tool for complicated flat structures. The cutting and forming tool includes a tool upper part with a cutting stamp and a tool lower part with a cutting plate.

BACKGROUND ART

Tools of this kind are generally known, and are used in the cutting out and forming of large surface metal sheets and multilayer formed plates. In the known tools for large surface plates, a cutting stamp and a cutting plate are designed as frames. Such frame form cutting stamps and cutting plates are difficult to produce, especially in complicated cutting forms. Because of the required precision, they usually include a single piece. Hardening of the single piece or subsequent effects of temperature on the single piece leads to distortion of the cutting edge. In case of damage to individual parts of the cutting edge, often the whole tool must be replaced and repairs are time consuming and expensive. Cutting edges which do not lie in one plane, but rather which follow a spatial form in three dimensions, can only be produced with very great expense and correspondingly equipped tool machines.

SUMMARY OF THE INVENTION

The problem of the present invention is to provide a cutting and forming tool with which complicated flat structures in the form of metal sheets or formed plates can be perfectly finished, and to provide even cutting edges which follow a three dimensional spatial form and which can be produced simply. Another problem of the invention is to find a new structure for the cutting stamp and the cutting plate so that the production, finishing, and repair of the cutting edges are simplified and more economical.

This problem is solved by the fact that the cutting plate and the cutting stamp includes a plurality of cylindrical cutting elements of polygonal cross-section lined up one after the other in the zone of the cutting line. Each of the cutting elements has a cutting edge in the first end surface. These cutting edges of the individual elements form the cutting line. The second end surface and the adjoining end portion of each individual cutting element are anchored into the cutting plate or cutting stamp.

In a further development of the invention, a cutting element each in the upper part of the tool and the lower part of the tool form a pair. The axes of these two cutting elements coincide, and the end surfaces with the cutting edges are directed toward each other. Another improvement of the tool may be obtained by the fact that the cutting elements have a hexagonal cross-section. An offset in steps with a cutting surface is formed at the zone of the first end surface. The cutting edge of one angle of the hexagon runs through the axis of the angle lying opposite.

In the cutting stamp and the cutting plate are arranged openings corresponding to the course of the cutting line. The individual cutting elements are set into these openings, while the cutting edges of the abutting or lined-up cutting elements are directed toward each other and form a cutting edge approximately at the cutting line. In principle, even cutting elements of triangular cross-section may be used. However, cutting elements of hexagonal cross-section have been found especially suitable since these are symmetrically formed and can be approximated to any curvature of the cutting line. Very strong curvatures are produced if the cross-sectional area of the individual elements is reduced, and thus smaller radii are possible. With this, the cutting edges of the cutting elements in the lower part and the upper part of the tool fit exactly together. A cutting element each in the lower and the upper part of the tool is assembled to a pair. Their axes are arranged to coincide, and the end surfaces with cutting edges are directed toward each other. The cutting elements in the cutting stamp or the cutting plate are anchored by means of known possibilities, for example, with clamping wedges, with screws or with glue. In a further development of the invention, the cross-section of the cutting element of the end surface converges with the cutting edge of the second end surface. This reduction of the cross-section area of the cutting element from the end surface with the cutting edge to the second end surface at the end portion which is anchored in the cutting plate or the cutting stamp, makes possible the production of curved cutting lines which are curved in the direction of the tool movement. Convex cutting lines may be produced with the tapered cutting elements, and concave lines may be produced with the normal cylindrical elements. Here also, cutting elements with smaller cross-section are used for narrow radii.

One preferred embodiment of the invention is distinguished by the fact that the material of the cutting stamp and the cutting plate is a plastic material, and the cutting elements are cast into this material. Hardening plastics with or without filler as plastic material may be used. Such known plastics are polyester, epoxyed or polyurethane resins. The cutting elements are set and cast into corresponding openings in the cutting stamp and the cutting plate, or positioned on a tool mold in a layer. Then the cutting stamp or the cutting plate is cast.

In a further embodiment of the invention, the cutting elements of the lower part of the tool limit a mold hollow space. A portion of the end surface with the cutting edge is beveled toward the mold hollow space. A mantle surface of the cutting element projects beyond the forming surface of the mold hollow space and forms a wall standing about perpendicular to same. The cutting elements of the upper part of the tool have springy tongues adjoining the step-form offset. This embodiment of the cutting elements is suitable for forming plates in which the edge is to be trimmed and the plate brought into a spatial form with the same tool. For this purpose, the cutting stamp of the upper part of the tool is arranged in collar-form around the pressing stamp, and a coupling device is arranged between the cutting stamp and the upper part of the tool. The complicated flat objects or plates are formed with the pressing stamp. The specially designed cutting elements make possible the erecting and folding over of the edge portion. In the same tool, the edge portions are trimmed. This makes possible the economical and rapid production of complicated formed plates.

The advantages attained with the invention include, in particular, the fact that even large-surface tools can be produced simply and economically. Since only the cutting elements are of hardened steel, the production and grinding of the cutting edges are very simple. The approximation to the desired cutting line is possible through the combining of the cutting edges of the individual cutting elements. This approximation to the desired cutting line is sufficient for many uses with sheet metal and one-layer and multilayer formed plates, and leads to an economical production. The use of plastics as support material for the cutting stamp and the cutting plate, and for the die and the pressing stamp, can further reduce the costs of production. Further, the tools are lighter and simpler to use because of the use of plastics.

BRIEF DESCRIPTION OF THE DRAWINGS

Examples of execution and further advantages will be explained in detail below from the drawings.

FIG. 2 shows a cutting element with hexagonal cross-section;

FIG. 3 shows a cutting element with formed springy elements for a cutting and pressing tool.

DETAILED DESCRIPTION OF A PREFERRED EMBODIMENT

Figure 1:
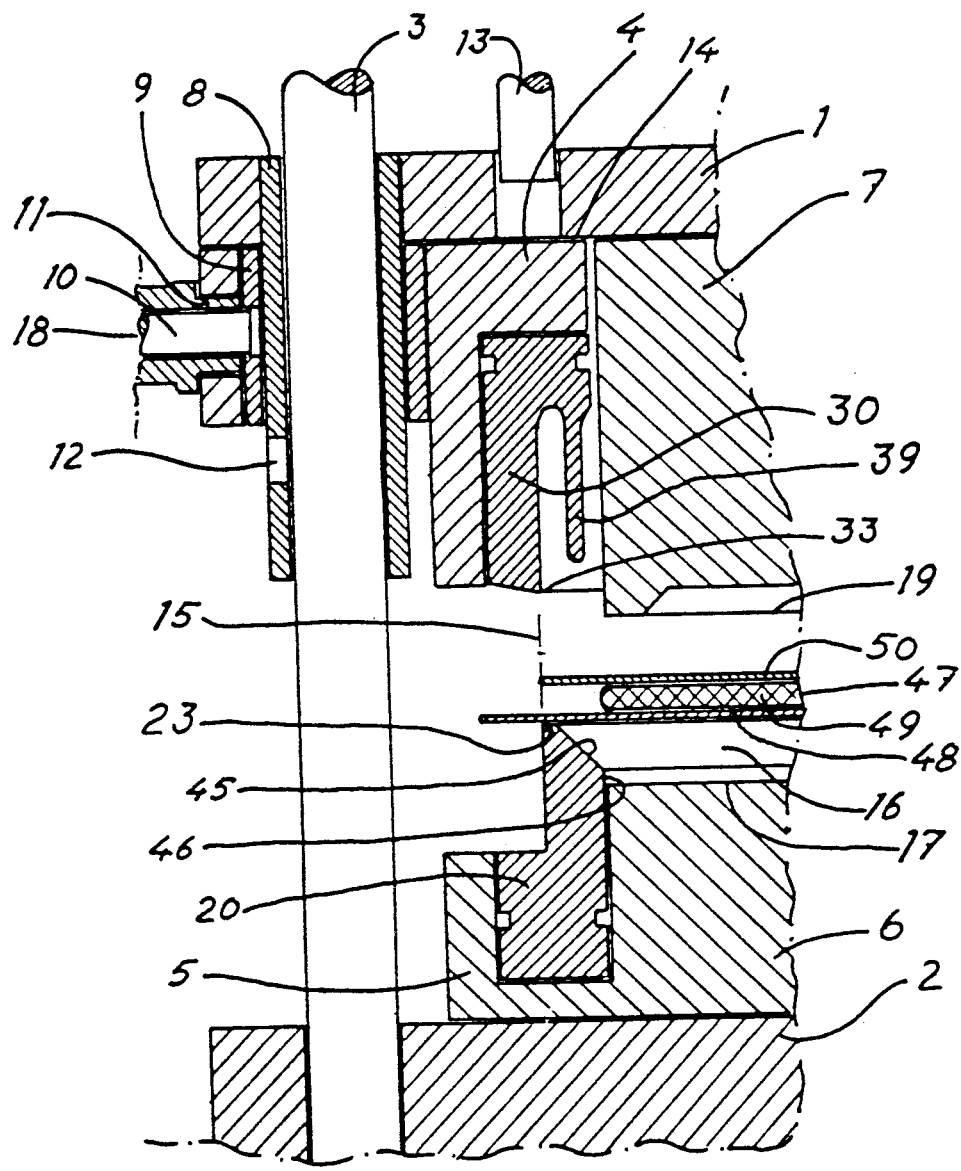
FIG. 1 shows a partial section through the edge portion of a tool according to the invention.

The tool represented in FIG. 1 includes a tool upper part 1 and a tool lower part 2 which are joined together through guides 3. Here, the tool upper part 1 is connected by guide bushings 8 which slide along the guide 3. The tool upper part 1 is joined with other devices, known but not represented, such as connections for driving movement and auxiliary devices. A pressing stamp 7 to the tool upper part 1 is fastened. Around the pressing stamp 7 is arranged a collar-form cutting stamp 4. The cutting stamp 4 is pressed by springs, not shown, against the upper part 1 of the tool, and is guided by means of guide bushings 8, 9 on the guides 3. At the outer portion of the cutting stamp 4 is arranged a coupling device 18 which has a coupling pin 10. The coupling pin 10 is guided in a slide bushing 11 and, at the upper dead point of the upper part of the tool 1, can be engaged in a coupling bore 12 against the guide bushing 8. In this position, the cutting stamp 4 strikes by its upper surface 14 against the stop 13. Cutting elements 30 are arranged and anchored on the side of the collar-form cutting stamp 4 toward the pressing stamp 7. The cutting elements 30 are designed as shown in FIG. 3.

To the lower part 2 of the tool is fastened a die 6 which forms a cutting plate 5 in the outer zone. Cutting elements 20 are in the cutting plate 5. The cutting elements 20 and the die form a molding hollow space 16. The molding hollow space 16 is designed according to the pressing stamp 7, and has a forming surface 17 which provides a multilayer formed plate 47 with the desired form. Individual layers 48, 49, 50 of the formed plate 47 are shown in FIG. 1 in their original form before the beginning of the form pressing. Cutting edges 23, 33 of the cutting elements 20, 30 are directed onto the cutting line 15. The cutting edges 23, 33 cut with the coming together of the two tool parts, the edge portion of the outer layer 48 of the forming plate 47. The cutting element 20 corresponds to the form of execution shown in FIG. 2. A first end surface 21 has a beveled partial zone 45. The cutting element 20 is positioned in the cutting plate 5 so that a mantle surface 46 projects above the forming surface 17, and so that a wall is provided which is at least as high as the outer layers 48, 50 of the forming plate 47.

In the example shown, both the cutting stamp 4 and the pressing stamp 7 and also the cutting plate 5 and the die 6 consist of a plastic material. The cutting elements 20. 30 are cast into the cutting plate 5 and the cutting stamp 4, respectively.

The production of formed plates 47 in the combined cutting and forming tool shown takes place by the uncut outer layer 48 and then the insulation layer 49 to be cut and the outer layer 50 being laid into the opened tool. Then the upper tool part 1 is run against the lower tool part 2. The pressing stamp 7 presses the individual layers 48, 49, 50 of the forming plate 47 into the desired form, while before the end of the forming process, the cutting edges 23, 33 of the cutting elements 20, 30 cut the edge portion of the outer layer 48. The tool has also a holding-down device (not shown) for the outer layer 48 which consists of an aluminum plate in the example shown. Through the pressing together of the pressing stamp 7 and the die 6, the edge portion of the outer layer 48 is erected against the wall formed by a wall zone 17 of the cutting element 20. The outer layer 50 is laid around the insulation layer 49 and pressed against the outer layer 48. The upper part 1 of the tool is then moved into the upper dead point and, in this position, the coupling pin 10 is moved into the coupling bore 12. Thus, the cutting stamp 4 is connected with the upper part 1 of the tool so that the ends of the springy elements 39 project above the end surfaces 19 of the pressing stamp 7. When the two parts of the tool are moved together again. the ends of the springy elements 39 strike against diagonal partial portions 45 on the cutting elements 20 and are turned toward the inside of the forming hollow space 16. In this way, the erected edge portion of the outer layer 48 are turned completely around so that a fold is formed and the edge portion of the outer layer 50 is clamped in. The upper part 1 of the tool is then run back to the upper dead point, and the coupling pin 10 is pulled back. After taking out the ready formed and cut formed plate 47, the tool is ready for further work cycles.

The individual cutting element 20, shown in FIG. 2, has a hexagonal cross-sectional area. The cutting element 20 includes hardened steel. At the upper end is cut out an offset 25 by which a cutting surface 26 with a cutting edge 23 is formed. The cutting edge 23 runs from one angle 27 of the hexagonal cross-section, through the axis 24, to the angle 28 lying opposite. The cutting edge 233 is a line of limitation of the first end surface 21. This includes a cutting angle with the cutting surface 26. The second end surface 22 is arranged at the lower end portion of the cutting element 20. An this end portion, a groove 29 extends around the mantle of the cutting element 20. The groove 29 is provided for anchoring into a cutting plate or a cutting stamp. This cutting element 20 is used both in tools which only carry out the edge cutting of the flat object, and also inn combined cutting and stamping tools. For the production of cutting tools, a plurality of cutting elements 20 are lined up one after the other, while the angle 27 in each case is adjusted exactly to the angle 28 of the next element. By rotating the elements around the longitudinal axis 24 and tilting the longitudinal axis 24, any desired contours of the cutting line can be produced.

The cutting element 30, shown in FIG. 3, is designed for use in the combined cutting and forming tool according to FIG. 1. The cutting element 30 is longer than the cutting element in FIG. 2, and has in the portion of an offset 35 a spring-elastic element 39 which is formed as one piece with the cutting element 330. Hardened spring steel is suitable for producing the cutting element 30. A first end surface 31 includes a cutting angle, with a cutting surface 36, and forms the cutting edge 33. This runs from an angle 37 of the hexagonal cross-section, through an axis 34, and to an angle 338 lying opposite. A groove 40, is arranged distanced from a second end surface 32 at the lower end of the cutting element 30. The groove 40 is provided for anchoring the cutting element 30 in the cutting stamp 4.

Figure 4:
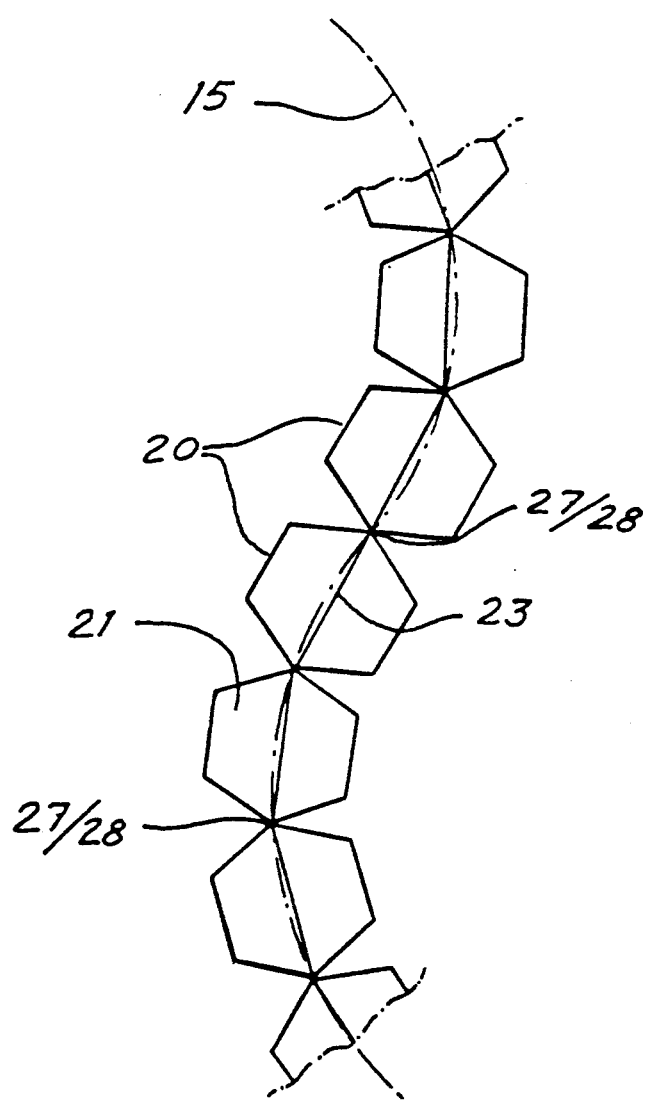
FIG. 4 shows the arrangement of cutting elements with hexagonal cross-section along the cutting line, in top view.

As shown in FIG. 4, cutting lines 15 can be approximated very well with hexagonal cutting elements 20. The cutting edges 23, with a curved course of the cutting line 15, form secants or tangents with this cutting line 15. The cutting elements 20 are pressed seamlessly together at angles 27, 28 to provide an uninterrupted cutting edge.

Having described a preferred embodiment of the invention, the following is claimed:

1. A cutting and forming tool for cutting and forming flat objects with at least one complicated nonlinear cutting and forming line to form complex flat structures, the cutting and forming tool including a tool upper part with a cutting stamp and a tool lower part with a cutting plate, the cutting stamp and cutting plate being movable along an axis towards and away from one another with the distinction that the cutting plate (5) and the cutting stamp (4) each include a plurality of adjoining cutting elements (20, 30) the cutting elements of the cutting plate cooperating with the cutting elements of the cutting stamp, each cutting element having the form of a prism and having a polygonal cross-sectional area taken in a direction transverse to the axis and lined up one after another in the zone of a cutting line (15), each of the cutting elements (20, 30) being the same size and having a cross-sectional area of the same form, each of the cutting elements (20, 30) having a cutting edge (23, 33) in a first end surface (21, 31), the cutting edges (23, 33) of the cutting elements (20, 30) forming a continuous nonlinear cutting line, each of the cutting elements (20, 30) having a second end surface (22, 32) which is opposite the first end surface (21, 31), the second end surface (22, 32) of each of the cutting elements (20, 30) and the adjoining end portion of each of the cutting elements (20, 30) being anchored into the respective cutting plate (5) and the cutting stamp (4).

2. A cutting and forming tool according to claim 1, with the distinction that the cutting elements (20, 30) in the upper part (1) of the tool and the lower part (2) of the tool form a pair in each case, the axes (24, 34) of each pair of cutting elements coinciding, and the end surfaces (21, 31) being directed toward each other by the cutting edges (23, 33).

3. A cutting and forming tool according too claim 1, with the distinction that the cutting elements (20, 330) have a hexagonal cross-section, a step-form offset being formed in the portion of the first end surface (21, 31) with a cutting surface (26, 36), and the cutting edge (23, 33) of one angle (27, 37) of the hexagon running through the axis (24, 34) to the angle (28, 38) lying opposite.

4. A cutting and forming tool according to claim 1, with the distinction that the cross-section of each of the cutting elements (20, 30) converges from the first end surface (21, 31) with the cutting edge (23, 33) to the second end surface (22, 32).

5. A cutting and forming tool according to claim 1, with the distinction that the material of the cutting stamp (4) and of the cutting plate (5) is a plastic mass, and the cutting elements (20, 30) are cast into this mass.

6. A cutting and forming tool according to claim 1, with the distinction that each of the cutting elements (20) of the lower part (2) of the tool limits a forming hollow (16), a partial zone (45) of the first end surface (21) is beveled with the cutting edge (23) toward the forming hollow (16), a mantle surface (46) of each of the cutting elements (20) projects above a forming surface (17) of the forming hollow (16) and forms a wall standing about perpendicular to same.

7. A cutting and forming tool according to claim 6, with the distinction that each of the cutting elements (30) of the upper part (1) of the tool has a springy element (29) adjoining a step-form offset (35).

8. A cutting and forming tool according to claim 6 with the distinction that the cutting stamp (4) of the upper part (1) of the tool is arranged in collar-form around a pressing stamp (7), and a coupling device (18) is arranged between the cutting stamp (4) and the upper part (1) of the tool.

* * * * *

UNITED STATES PATENT AND TRADEMARK OFFICE
CERTIFICATE OF CORRECTION

PATENT NO. : 5,067,339

DATED : November 26, 1991

INVENTOR(S) : Gerhard Pirchl

It is certified that error appears in the above-identified patent and that said Letters Patent is hereby corrected as shown below:

Column 6, Line 10, Claim 3, change "too" to --to-- and

Line 11, Claim 3, change "330" to --30--.

Signed and Sealed this

Thirtieth Day of March, 1993

*Attest:*

STEPHEN G. KUNIN

*Attesting Officer*  Acting Commissioner of Patents and Trademarks